Patented June 18, 1946

2,402,134

UNITED STATES PATENT OFFICE 2,402,134

PREPARATION OF HYDANTOIN

William F. Gresham and Carl E. Schweitzer, Wilmington, Del., assignors to E. I. du Pont de Nemours & Company, Wilmington, Del., a corporation of Delaware No Drawing. Application April 25, 1945,
Serial No. 590,312

10 Claims. (Cl. 260—309.5)

This invention relates to the preparation of nitrogen compounds, and more particularly to a method for manufacturing hydantoin from aminoacetonitrile and ammonium carbonate.

Heretofore, hydantoin has been prepared by various methods which were not adaptable to practical manufacture on a commercial scale. For example, one laboratory method of preparation which has been employed in the past was to heat cyanic acid with aminoacetic acid to obtain hydantoic acid, which could be converted, by further treatment with aqueous hydrochloric acid, into its lactam, hydantoin.

An object of this invention is to provide a commercially feasible method for the manufacture of hydantoin from relatively inexpensive and readily available materials. Other objects will appear hereinafter.

These objects are accomplished in accordance with this invention by heating aminoacetonitrile with aqueous ammonium carbonate, whereby a solution containing ammonium hydantoate is formed, and thereafter treating the resulting reaction product with an acid. In this manner, high yields (exceeding 70%) of hydantoin are very readily obtained.

The reaction between aminoacetonitrile and ammonium carbonate is preferably conducted in accordance with this invention at a temperature of about 50° to 150° C., best results being obtained within the range of 60° to 80° C. The resultant solution, in one specific embodiment of the invention, is evaporated substantially to dryness, and is thereafter treated with dilute aqueous sulfuric acid (which produces a mixture containing hydantoin), after which the mixture is made basic with ammonium hydroxide, and again evaporated to dryness. The residue obtained in this manner is extracted with liquid ammonia which removes hydantoin from the mixture, leaving behind a residue of ammonium sulfate. The hydantoin is isolated by evaporation of ammonia from the ammonia extract.

The molar ratio of aminoacetonitrile to ammonium carbonate in the initial reaction mixture may vary widely but is generally within the range of from 1:1 to 1:10, preferably 1:1.5 to 1:4. Enough water is employed to dissolve the reacting substances. If desired, at least a part of this water may be replaced by any suitable organic solvent, such as methanol or dioxane.

The reaction between aminoacetonitrile and aqueous ammonium carbonate is preferably conducted under superatmospheric pressure in a suitable autoclave. Very high pressures are not required, autogenous pressures of 10 to 50 pounds per square inch above atmospheric pressure being in most instances sufficient for optimum results.

The invention is illustrated further by means of the following example.

*Example.*—A mixture containing 28 grams of aminoacetonitrile, 96 grams of ammonium carbonate and 140 grams of water was heated in a closed vessel for 2 hours at a temperature of 67° to 79° C. under a gauge pressure of about 30 pounds per square inch. The resulting product was withdrawn from the reaction vessel and was evaporated to dryness on a steam bath. The residue (weight 52 grams), which contained ammonium hydantoate and hydantoin, was mixed with a solution of 35 grams $H_2SO_4$ in 140 cc. of water, and the mixture was heated under refluxing conditions for 3 hours. The resulting product was made basic by addition of ammonium hydroxide, after which the mixture was evaporated to dryness on a steam bath under diminished pressure. Extraction of the residue with liquid ammonia followed by evaporation of the ammonia extract gave 36.1 grams of hydantoin (M. P., 200° to 204° C.).

It will be understood that the above example is illustrative only and that many embodiments of the invention will occur to those who are skilled in the art. For example, any suitable acid, preferably a dilute aqueous solution of an inorganic acid, such as phosphoric, hydrochloric, etc., may be employed in place of aqueous sulfuric acid, and any convenient method may be used for separating hydantoin from the ammonium salt produced during the acidification.

Accordingly, the invention is limited only as set forth in the following claims.

We claim:

1. A method for the preparation of nitrogen compounds which comprises heating aminoacetonitrile with aqueous ammonium carbonate at a temperature of at least 50° C. under superatmospheric pressure, whereby a solution containing ammonium hydantoate and hydantoin is obtained.

2. A method for the preparation of nitrogen compounds which comprises heating aminoacetonitrile with aqueous ammonium carbonate at a temperature of at least 50° C. under superatmospheric pressure and thereafter subjecting the resulting product to the action of an acid, whereby a mixture containing hydantoin is produced.

3. A method for the preparation of nitrogen compounds which comprises reacting aminoacetonitrile with aqueous ammonium carbonate at a temperature of about 50° to 150° C. under superatmospheric pressure and thereafter subjecting the resulting product to reaction with an inorganic acid, whereby a mixture containing hydantoin is produced.

4. A method for the preparation of nitrogen compounds which comprises reacting aminoacetonitrile with aqueous ammonium carbonate at a temperature of about 60° to 80° C. under superatmospheric pressure and thereafter subjecting the resulting product to reaction with an inorganic acid, whereby a mixture containing hydantoin is produced.

5. A method for the preparation of nitrogen compounds which comprises reacting aminoacetonitrile with aqueous ammonium carbonate at a temperature of about 60° to 80° C. under a superatmospheric pressure of about 10 to 50 pounds per square inch and thereafter subjecting the resulting product to reaction with an inorganic acid, whereby a mixture containing hydantoin is produced.

6. A method for the preparation of nitrogen compounds which comprises reacting aminoacetonitrile with aqueous ammonium carbonate at a temperature of about 60° to 80° C. under a superatmospheric pressure of about 10 to 50 pounds per square inch and thereafter subjecting the resultant product to the action of hot aqueous inorganic acid, whereby a mixture containing hydantoin is produced.

7. A method for the preparation of nitrogen compounds which comprises reacting aminoacetonitrile with aqueous ammonium carbonate at a temperature of about 60° to 80° C. under a superatmospheric pressure of about 10 to 50 pounds per square inch, evaporating the resulting solution substantially to dryness, thereafter subjecting the resultant product to the action of hot aqueous inorganic acid, and separating hydantoin from the resultant mixture.

8. A method for the preparation of nitrogen compounds which comprises reacting aminoacetonitrile with aqueous ammonium carbonate at a temperature of about 60° to 80° C. under a superatmospheric pressure of about 10 to 50 pounds per square inch, evaporating the resulting solution substantially to dryness, subjecting the resultant product to the action of hot aqueous sulfuric acid, making the solution basic by addition of ammonia, and separating hydantoin from the resultant mixture.

9. A method for the preparation of nitrogen compounds which comprises reacting aminoacetonitrile with aqueous ammonium carbonate at a temperature of about 60° to 80° C. under a superatmospheric pressure of about 10 to 50 pounds per square inch, evaporating the resulting solution substantially to dryness, subjecting the resultant product to the action of hot aqueous sulfuric acid, and making the solution basic by addition of ammonia, evaporating the resulting hydantoin-containing solution to dryness.

10. A method for the preparation of nitrogen compounds which comprises reacting aminoacetonitrile with aqueous ammonium carbonate at a temperature of about 60° to 80° C. under a superatmospheric pressure of about 10 to 50 pounds per square inch, evaporating the resulting solution substantially to dryness, subjecting the resultant product to the action of hot aqueous sulfuric acid, and making the solution basic by addition of ammonia, evaporating the resulting solution to dryness, extracting the resulting residue with ammonia, and removing ammonia from the extract by evaporation, whereby hydantoin is produced.

WILLIAM F. GRESHAM.
CARL E. SCHWEITZER.